US008396760B1

(12) United States Patent
Bradley et al.

(10) Patent No.: US 8,396,760 B1
(45) Date of Patent: Mar. 12, 2013

(54) BEHAVIORAL FILTER FOR PERSONALIZED RECOMMENDATIONS

(75) Inventors: Andrew J. Bradley, Glasgow (GB); David Neil Turner, Edinburgh (GB); Robert Philip Japp, Stirling (GB); Oliver Rupert Masting, Edinburgh (GB); Matthew J. Round, West Lothian (GB)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/015,413

(22) Filed: Jan. 27, 2011

(51) Int. Cl.
*G06Q 30/00* (2012.01)
(52) U.S. Cl. ...................................... 705/26.7; 705/26.1
(58) Field of Classification Search .................. 705/26.1, 705/26.7, 27.1
See application file for complete search history.

(56) References Cited

U.S. PATENT DOCUMENTS

| 7,321,892 | B2 | 1/2008 | Vadon et al. |
| 7,668,821 | B1 * | 2/2010 | Donsbach et al. ............ 707/765 |
| 7,953,740 | B1 | 5/2011 | Vadon et al. |
| 2002/0010625 | A1 | 1/2002 | Smith et al. |
| 2008/0243637 | A1 | 10/2008 | Chan et al. |
| 2008/0294617 | A1 * | 11/2008 | Chakrabarti et al. ............. 707/5 |

OTHER PUBLICATIONS

Basu Roy, S., "Efficient exploration techniques on large databases," .Ph.D. dissertation, The University of Texas at Arlington, 2011, 256 pages; AAT 3456788.*

* cited by examiner

*Primary Examiner* — Brandy A Zukanovich
(74) *Attorney, Agent, or Firm* — Knobbe Martens Olson & Bear LLP

(57) ABSTRACT

This disclosure describes systems and associated methods that can selectively filter seed behavior, e.g., user activity used to generate item recommendations. In some embodiments, seed behaviors and catalog items are associated with categories in an electronic catalog, and a particular seed behavior is used to generate user recommendations if it is more recent than a user's last purchase in the category of the seed behavior. For example, a user's activity in the TV category, e.g., viewing various TV models, may not be used to generate recommendations if the activity occurred prior to the user's purchase of a TV. As a result, in certain embodiments, additional TVs may not appear in the user's recommendations following her purchase, reflecting that the user has fulfilled her desire to purchase a TV.

9 Claims, 5 Drawing Sheets

BEHAVIORAL FILTER FOR PERSONALIZED RECOMMENDATIONS

BACKGROUND

A variety of methods are known for detecting behavior-based associations (associations based on user behaviors) among items stored or represented in a database. For example, the purchase histories or item viewing histories of users may be analyzed to detect behavior-based associations between particular items represented in an electronic catalog (e.g., items A and B are related because a relatively large number of those who purchased A also purchased B). As another example, the web browsing histories of users may be analyzed to identify behavior-based associations between particular web sites and/or web pages.

The detected behavior-based associations may be used to assist users in locating items of interest. For example, in the context of an electronic catalog, when a user accesses a network resource, such as a web page, that is associated with an item, the resource may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, search related behaviors, and/or other item selections.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Figure 1:
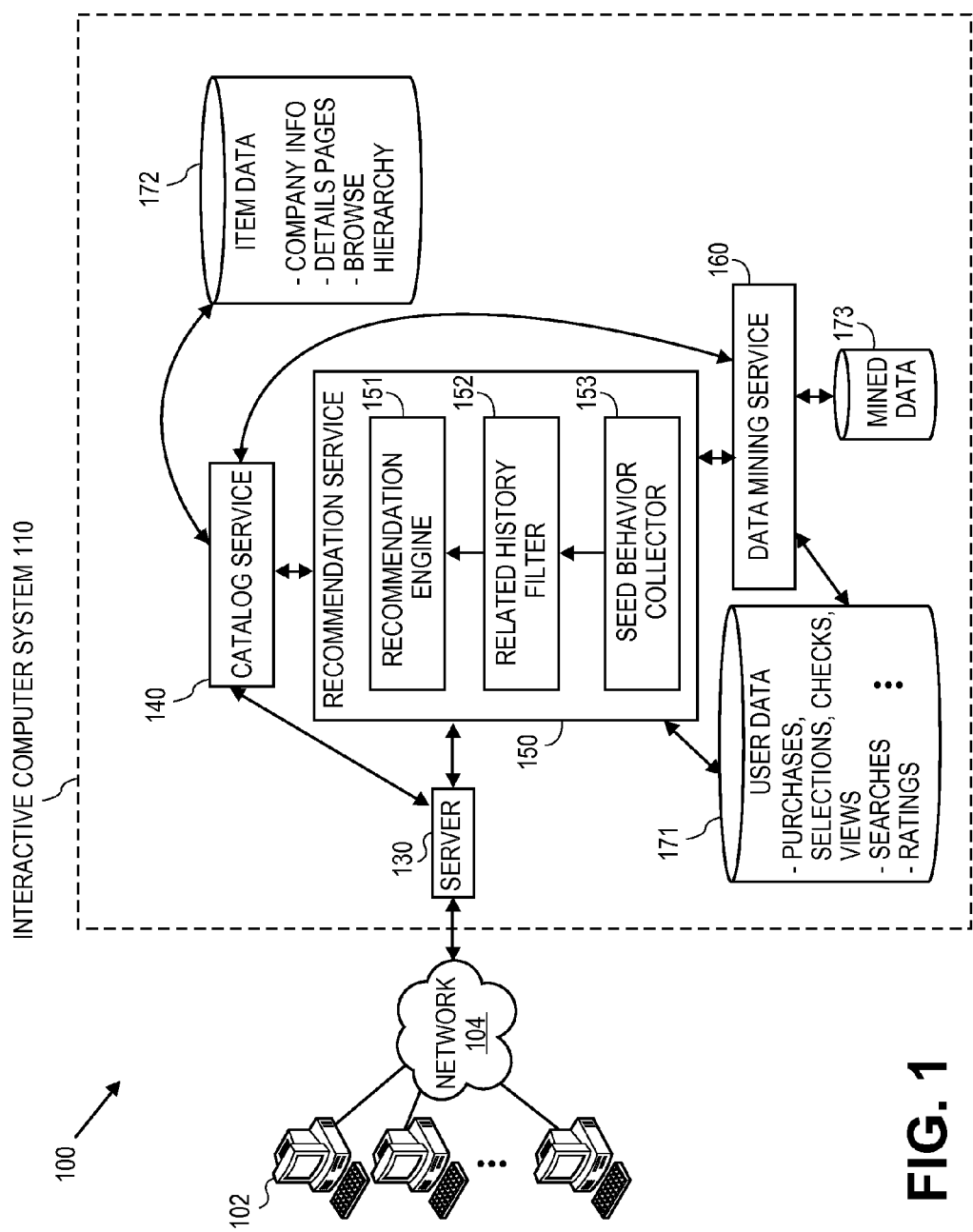
FIG. 1 illustrates an embodiment of a system for providing user recommendations.

Personalized recommendations can be generated for a user based on the user's interactions with an electronic catalog. These interactions may include purchases, item selections (e.g., page requests), category selections, searches, and the like. This catalog activity data can provide information about the user's interests, which in turn allows a recommendation system to find items that match or complement these interests.

When customized item recommendations are generated at least in part from user activity, further filtering of the results can sometimes improve the customer experience. For example, following a purchase, a user likely will not want to see the purchased item listed in her item recommendations. It can therefore be advantageous to remove from a list of items recommended to a user items that also appear in the user's purchase history. Such filtering, however, suffers from some notable shortcomings. For example, a user wishing to purchase a TV will likely view and consider various models before deciding which TV to purchase. Therefore, after purchasing a particular TV model, the user's catalog activity data may contain views, clicks, searches, and other behaviors directed to many different TV models. When such activity data is provided to a recommendation engine, the recommendation engine may generate a list of recommended items that includes various TV models, even when the purchased model is specifically removed from the list. The user, however, has already decided which TV to purchase and likely will not wish to see, at least for some period of time, other TV models in her recommendations.

This disclosure describes systems and associated methods that may alleviate such shortcomings by selectively filtering seed behavior, e.g., user activity used to generate item recommendations. In some embodiments, seed behaviors and catalog items are associated with categories in an electronic catalog, and a particular seed behavior is used to generate user recommendations if it is more recent than a user's last purchase in the category of the seed behavior. For example, a user's activity in the TV category, e.g., viewing various TV models, may not be used to generate recommendations if the activity occurred prior to the user's purchase of a TV. As a result, in certain embodiments, additional TVs may not appear in the user's recommendations following her purchase, reflecting that the user has fulfilled her desire to purchase a TV.

For purposes of illustration, the systems and processes disclosed herein are described primarily in the context of an interactive computer system that provides users with access to, and recommendations from, a catalog of items on an e-commerce web site. As will be apparent, however, the disclosed systems and processes may also be used in other types of systems, and can be used to recommend other types of items, such as but not limited to web sites, news articles, blogs, podcasts, travel destinations, service providers, other users (e.g., as potential friends in a social network), events, discussion boards, photos and other images, online videos, tagged items, advertisements, and user-generated lists of items. In addition, the disclosed systems and processes need not be implemented as part of, or in conjunction with, a web site.

The term "item" is used interchangeably herein to refer to an item itself (e.g., a particular product, service, bundle of products or services or any combination thereof) and to its description or representation in a computer system. As will be apparent from the context in which it is used, the term is also sometimes used herein to refer only to the item itself or only to its representation in the computer system.

II. System Overview

FIG. 1 depicts an embodiment of a network environment 100 capable of providing personalized recommendations to users. In the depicted embodiment, the accuracy of personalized recommendations may be improved by a related history filter 152. The related history filter 152 may selectively filter seed behaviors used by the recommendation engine 151 to generate personalized recommendations.

In the environment 100, users can access an interactive computer system 110 with user systems 102. The user systems 102 that access the interactive computer system 110 can include, for example, computing devices, such as desktop computers, laptop computers, tablets, personal digital assistants (PDAs), mobile phones, electronic book readers, other wireless handheld devices, set-top or other television boxes, media players, video game platforms, kiosks, and/or the like. The user systems 102 access the interactive computer system 110 over a network 104, which can be a local area network, a wide area network (such as the Internet), or any other medium of computer data transfer.

The interactive computer system 110 can be implemented with one or more physical servers or computing machines. Thus, each of the components depicted in the interactive computer system 110 can include hardware and/or software for performing various features. In one embodiment, the interactive computer system 110 is a web site that allows users to interact with a catalog of items.

In the depicted embodiment, the interactive computer system 110 includes several components that can be implemented in hardware and/or software. For instance, the interactive computer system 110 includes one or more servers 130 for receiving, processing, and responding to requests from user systems 102. The one or more servers 130 can include web servers, application servers, database servers, or other types of servers. The servers 130 can be geographically co-located or geographically dispersed.

The one or more servers 130 access information about items in an electronic catalog by communicating with a catalog service 140. The catalog service 140 provides access to an item database 172 that may store information about an item catalog, including item details, item categories, item relationships, item ratings, customer reviews, author pages, user-generated list pages, forum pages, blog pages, and the like. In one embodiment, at least some of this content is arranged in a hierarchical structure, having items associated with one or more categories or browse nodes in a hierarchy. The catalog service 140 can provide functionality for users to browse pages in the item hierarchy in addition to searching the catalog. Users can select an item represented in the hierarchy or in a list of search results to view more details about an item.

The interactive computer system 110 may further include a data mining service 160 that generates and provides access to mined data 173. Mined data 173 may include item association tables and datasets that store information about item associations and/or relationships. The data mining service 160 may generate mined data 173 by analyzing users' purchase histories, item viewing histories, or other user activity data, and detecting and quantifying behavior-based associations between specific items. For instance, if purchase histories are used, item A may be mapped to item B in a purchase-based associated items table if a relatively large number of the users who purchased item A also purchased item B. More generally, associations can be based on correlating any activities made by users, and not just purchase activities (e.g., search, viewing, etc.).

Associations between items may, for example, be used to detect items that are substitutes for and items that are complementary to each other. Complementary items, for example, may be detected by analyzing user purchase history: items that are often purchased together or in succession may be complementary. On the other hand, items that are substitutes for one another may be detected by analyzing user browsing activity: items that often are viewed together or in succession, such as items viewed during a single browsing session, may be substitutes for one another. As an example, if dishes and utensils are often purchased together, these items may be complementary; if various microwave models are viewed in succession—activity that may indicate systematic evaluation of various alternatives—these items may be substitutes for one another. Other logical or function relationships may also be detected based on user activity data.

The interactive computer system 110 may also include a recommendation service 150 that assembles and provides to the one or more servers 130 a list of items that may be of interest to a user. The recommendation service 150 may include a recommendation engine 151, a related history filter 152, and a seed behavior collector 153.

The seed behavior collector 153 may retrieve from a user database 171 seed behavior information, including user activity information, which may be used to generate recommendations for a user. User activity information may include information such as a user's purchases, selections, clicks, views, searches, ratings, page requests, additions of items to wish lists and shopping carts, user interface events, tagging activity, combinations of the same, and/or the like. The seed behavior collector 153 may pass the assembled seed behavior information to the related history filter 152.

The related history filter 152 may analyze and selectively filter at least some of the seed behavior information that is related to one or more of a user's purchases. For example, the related history filter 152 may filter recent browsing behaviors that led to a user's recent purchase. In some embodiments, purchases and seed behaviors may have associated categories, and seed behaviors that occurred prior to a user's most recent purchase in the category of the seed behavior are filtered. In other embodiments, all seed behaviors, regardless of category, that occurred prior to a user's most recent purchase are filtered. The filtered seed behaviors may be removed from a list of seed behaviors; alternatively, the filtered seed behaviors may be flagged, weighted, modified, moved to another list, reduced in priority, or otherwise attenuated. Seed behavior filtering may reduce the likelihood that the user continues to receive recommendations for items similar to those she purchased despite having completed her purchase goal.

The related history filter 152 may pass the filtered information to the recommendation engine 151, which uses the filtered information to generate recommendations for a user. In addition to the filtered activity information, the recommendation engine 151 may also use information provided by the data mining service 160 to generate recommendations. The recommendation engine 151 may use any of a variety of algorithms for generating recommendations. One such algorithm is to recommend items to the user that the user previously viewed or selected while browsing. Of these browsed-for items, those related to a purchase can be filtered out by the related history filter 152. Other recommendation algorithms can recommend items that are related to items the user browsed for or purchased.

For example, the recommendation engine 151 may use mined data 173 generated by the data mining service 160 to determine item associations. The recommendation engine 151 may then use item associations to recommend items that are substitutes for or that are complements to items in a user's activity data, such as recently viewed items, or items that are complements to recently purchased items, or the like. The recommendation engine 151 may perform these and other algorithms described in greater detail in U.S. Publication No. 2002/0019763, filed Mar. 29, 2001, and titled "Use of Product Viewing Histories of Users to Identify Related Products," the disclosure of which is hereby incorporated by reference in its entirety.

In some embodiments, the recommendation engine 151 generates recommendations for items that are substitutes for or that are complements to items viewed in a user's current browsing session. Recommendation engine 151 may also use probabilistic selection or scoring methods to effectively introduce noise into selected recommendations, causing the recommendations to vary in a controlled manner between recommendation access events. Further still, recommendation engine 151 may use data from third-party content providers, for example, a user's activity on a social network, to generate recommendations. The recommendation service may 150 provide recommendations generated by the recommendation engine 151 to the one or more servers 130. The one or more servers 130 may provide the recommendations to the user.

It should be noted that the processing of the various components of the interactive computer system 110 can be distributed across multiple machines, networks, and other computing resources. The various components of the interactive computer system 110 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

III. Seed Behavior Filter Process

Figure 2:
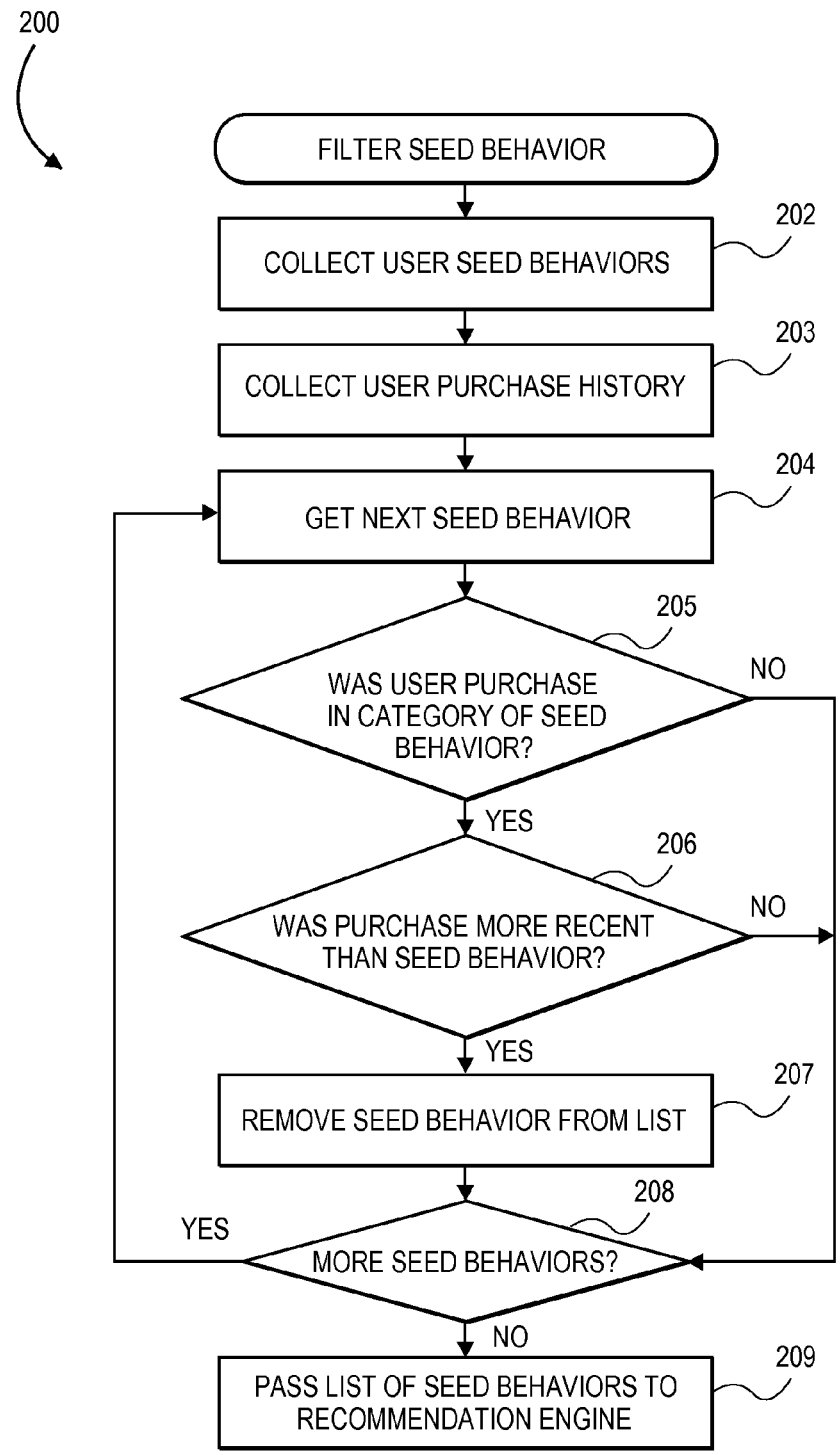
FIG. 2 illustrates an embodiment of a seed behavior filter process.

FIG. 2 illustrates an embodiment of a seed behavior filter process 200. As described above, seed behaviors such as user activity data may be used to generate personalized recommendations. Such seed behaviors may be selectively filtered to improve the effectiveness of generated recommendations. This selective filtering may be accomplished by the process 200. In some embodiments, the seed behavior filter process 200 is implemented by the interactive computer system 110. For example, the related history filter 152 can implement blocks 204 through 209 of the seed behavior filter process 200. The seed behavior collector 153 can implement blocks 202 and 203.

At block 202, user seed behaviors are collected. Such behaviors may, in some embodiments, be collected by the seed behavior collector 153 and may be collected according to various criteria. Seed behaviors may include information about user activities such as purchases, selections, clicks, views, searches, ratings, page requests, additions of items to wish lists and shopping carts, user interface events, and/or tagging activity, to name a few. The user database 171 may include details about such seed behaviors, such as a type of user activity that occurred (e.g., click, view, search, purchase, and/or the like); a category in which the activity occurred; date, time, and/or session information related to the user activity; search terms used in a search query, combinations of the same, or the like.

At block 203, user purchase history is collected. In some embodiments, user purchase history is a subset of user seed behaviors, which, as described above, may include user purchases. In other embodiments, user purchase history is collected separately from seed behavior data. User purchase history may include information such details about a purchased item, one or more categories in the electronic catalog associated with the purchased item, a date and time when the purchase occurred, pricing information, associated session information, combinations of the same, or the like.

In some embodiments, the interactive computer system 110 maintains longer purchase histories for users than browse histories because purchases may be more relevant to user behavior in the long term than browsing behavior. The collection of the user's purchase history at block 203 can therefore be limited to more recent purchase history in one embodiment. For example, in one embodiment the seed behavior collector 153 does not consider purchase histories made before the user's existing browse history begins.

Further, a user's purchase history can be collected from sources other than the user's purchase activities in the interactive computer system 110. The interactive computer system 110 may provide a user interface, for instance, that allows a user to report purchases that the user has made, including purchases made using other systems or offline. For filtering purposes, the interactive computer system 110 can consider the purchase date and/or time of these other purchases to be the date and/or time they are reported to the interactive computer system 110.

Moreover, a user's purchases on other web sites can be accessed programmatically by the seed behavior collector 153 in some implementations. The seed behavior collector 153 may include a mechanism for correlating user identities in the interactive computer system 110 with user identities on other web sites. The seed behavior collector 153 can query these web sites to obtain a user's purchase history and/or other activity data. An example mechanism for correlating user identities on other websites is described below.

At blocks 204-208, one example approach for filtering the list of seed behaviors is shown. In this example, filtering is accomplished by individually analyzing and filtering each seed behavior a set of seed behaviors. For example, at block 204, a seed behavior is retrieved for analysis from a list of seed behaviors. At block 205, it is determined whether the user has made a purchase in the same category as the seed behavior. If the user has not made a purchase in the same category as the seed behavior, process 200 continues to block 208, where it is determined whether there are more seed behaviors to analyze. If, on the other hand, the user has made a purchase in the same category as the seed behavior, process 200 continues to block 206.

At block 206, it is determined whether the purchase was more recent than the seed behavior. If the purchase was not more recent than the seed behavior, process 200 continues to block 208, where it is determined whether there are more seed behaviors to analyze. If the purchase was more recent than the seed behavior, the process 200 continues to block 207.

At block 207, the seed behavior that occurred before the purchase is removed from the list of seed behaviors. Although the seed behavior is removed from the list of seed behaviors, it may persist elsewhere, for example, in user database 171 of interactive computer system 110. In other embodiments the seed behavior, instead of being removed from the list, is flagged, weighted, modified, moved to another list, or the like. In still other embodiments, seed behaviors that are not selected for removal are added to a new list of behaviors for generating recommendations, while seed behaviors selected for removal are not so added.

The process 200 continues at block 208, where it is determined whether there are more seed behaviors to analyze. If there are more seed behaviors to be analyzed, the process continues to block 204, where the next seed behavior is retrieved for analysis. If all seed behaviors have been analyzed, the process 200 continues to block 209.

At block 209, the list of seed behaviors is provided for generating recommendations. In some embodiments, the list of seed behaviors is provided to a recommendation engine such as the recommendation engine 151 in the interactive computer system 110.

IV. Variations of Seed Behavior Filter Process

In some embodiments, the aggressiveness of seed behavior filtering may be adjusted to be stricter than filtering seed behaviors related to a purchase category. For example, in one implementation, all seed behaviors (regardless of category) that occurred prior to a user's most recent purchase may be filtered. Such strict filtering may be appropriate, for instance, where there is a cost of presenting each recommended item to a user, such as when recommendations are presented in an advertising context (e.g., on third party web sites). In such a case, it may be preferable to favor exclusion of potentially relevant items over inclusion of items in which the user is no longer interested.

Filtering may also be made stricter by filtering seed behaviors in categories beyond those in which a user has made a recent purchase. For example, a list of items that are substitutions for a purchased item may be generated by the data mining service 160. Seed behaviors in the categories of these substitutions may then be filtered. Alternatively, the process may continue iteratively so that further substitutions of the substitutions are accessed and used to exclude seed behaviors in their categories. The iterative process may, for example, terminate when the numbers of excluded categories, the number of items in the excluded categories, or the degree of similarity of the excluded categories reaches a certain threshold.

In other embodiments, instead of filtering seed behaviors related to purchases, user recommendations generated based on such seed behaviors may be filtered after they are generated. The recommendation engine 151 may keep track of which source behaviors are used to generate each recommended item. The list of recommended items may then be filtered based on the user's seed behaviors. For example, if a user recently purchased a digital camera, recommendations generated from source behaviors occurring in the digital camera category may be filtered. The filtered recommendations may be removed, hidden, attenuated in priority, decreased in number or frequency, or the like.

Generated recommendations also may be filtered based on the category of the recommended item. For example, a recommended item may be filtered if it occurs in the same category as a user's purchase. Alternatively, a recommended item may be filtered if it occurs in the same category as a user's purchase and if the most recent seed behavior used to generated the recommendation occurred prior to the purchase. Further still, a recommended item may be filtered if it occurs in the same category as a user's purchase and if any seed behavior used to generate the recommendation occurred prior to the purchase. Filtered recommendations may be removed, reduced in priority, and/or otherwise attenuated. The degree of reduction in priority or attenuation may be based on the degree to which seed behaviors occurring prior to the purchase contributed to the recommendation.

In still other embodiments, some categories of seed behaviors or recommended items may be excluded from the filtering process. Such exclusion may be appropriate, for example, where a user might wish to purchase multiple items in a category. Such categories may include media items such as books, music, movies, video games, software, and the like. As an example, a user who has purchased a music CD might also be interested in purchasing other CDs by related artists. It may, therefore, be advantageous to exclude the music category from the filtering process so that additional, similar music items may be recommended to the user.

It should also be noted that although purchase-related seed behaviors are filtered out in certain embodiments, that some purchase-related recommendations may still be generated. For example, items that have complementary associations to items a user purchased may still be good candidates for recommendation, such as a camera case related to a recently-purchased camera. Thus, the user's actual purchases need not be filtered out of the set of seed behaviors for the user in some embodiments, at least for the purpose of obtaining complementary associations to such purchases. On the other hand, substitution-associated items, which may be similar to the items purchased (e.g., another brand of camera), may be filtered out of the recommendations.

Further, as mentioned above, recommendations can be provided in an advertising context, such as by the interactive computer system 110 providing advertisements on third party web sites. The recommendation service 150 of the interactive computer system 110 can generate targeted advertisements to users of other sites in one embodiment based on information regarding those users' browsing and purchase activities on those websites. For instance, an agreement can exist between a provider of a third party website and a provider of the interactive computer system 110 that allows the third party website to share user data with the interactive computer system 110. The third party website can provide data regarding user purchases and browsing activity to the interactive computer system 110, which can then return targeted advertisements that employ any of the purchase-related filtering concepts described herein. In addition, the third party website and the interactive computer system 110 can provide or exchange user cookie information (or other user identifier information) to correlate the identities of users of both sites. The interactive computer system 110 can then generate recommendations or advertisements for users on third party sites based on their user activity with respect to the interactive computer system 110 instead of or in addition to their third-party website activity.

V. Adjusting Seed Behavior Filter Process

Figure 3:
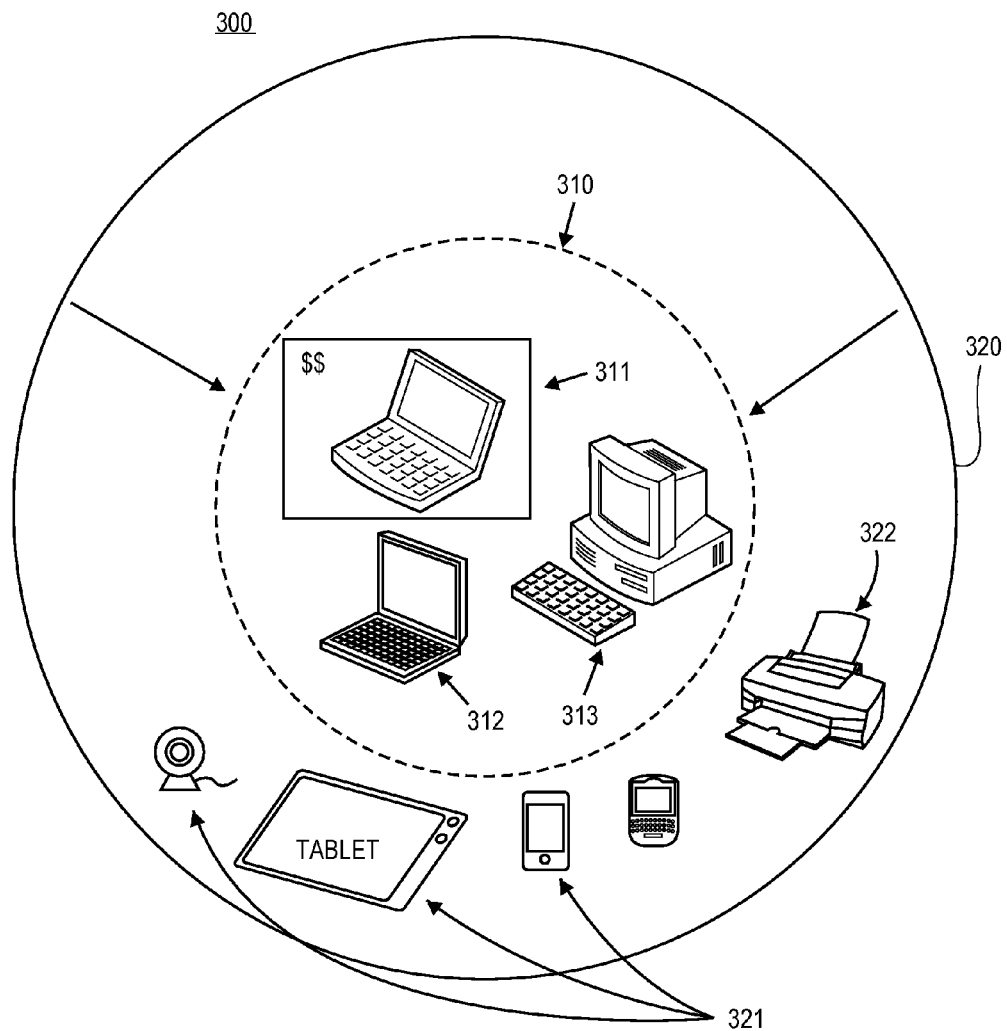
FIG. 3 illustrates an embodiment of a process of adjusting category designations.

FIG. 3 depicts an example scenario 300 that illustrates how, in certain embodiments, adjusting category designations may increase the effectiveness of generated recommendations.

In FIG. 3, a user has purchased a laptop 311. If the electronic catalog category of the laptop is defined as electronics 320, seed behaviors occurring in this category prior to the purchase may be filtered. However, as will be shown below, it may be more effective, in some embodiment, to filter seed behaviors based on a narrower category. For example, if the user viewed prior to the purchase of the laptop 311 a printer 322 that is also associated with the electronics category 320, this behavior might be filtered out, and the user might not receive any printer recommendations after purchasing the laptop 311. Having purchased a laptop, however, the user might still be interested in purchasing a printer. This shortcoming may be addressed by narrowing the category of the laptop 311.

If, for example, the category of the laptop 311 is narrowed to contain only computers, the resulting category 310 may not include seed behaviors directed to printers. Accordingly, such seed behaviors might not be filtered out, and the user's recommended items may include printers generated as a result of the user's pre-purchase interest in the printer 322. The user's recommended items, however, may not contain computers generated as a result of the user's pre-purchase interest in a desktop 313 or a different laptop 312, as these items occur in the narrower computer category 310 of which the purchased laptop 311 is also a member. This may increase the effectiveness of generated recommendations by reflecting both the user's desire to purchase computer accessories or other electronic devices and her simultaneous desire not to purchase another computer.

Figure 4:
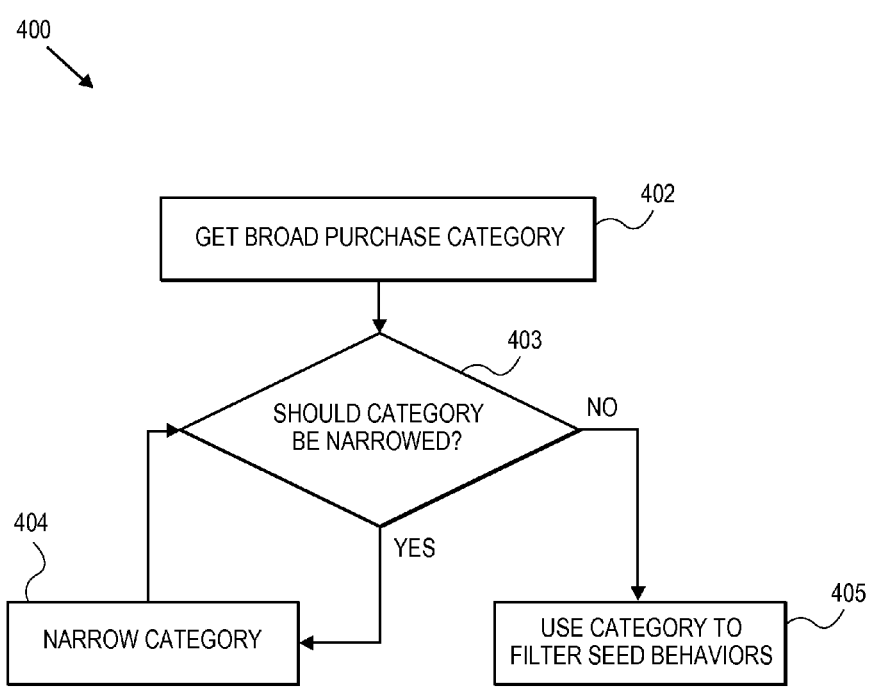
FIG. 4 illustrates an additional embodiment of a method for adjusting category designations.

FIG. 4 illustrates an embodiment of a process 400 for incorporating the category adjustment illustrated in FIG. 3. In the process 400, a category of a purchase may be determined. The process 400 may, for example, be implemented by the recent history filter 152 or the seed behavior collector 153.

In certain embodiments, such as that illustrated in FIG. 4, purchases and seed behaviors occur in multiple categories at different levels of a browse hierarchy. For example, a laptop 311 might be classified in the electronics category 320 and in the narrower computers category 310. The laptop 311 could further be classified in narrower categories (e.g., portable computers), broader categories, and/or intermediate categories.

To determine the category of a purchase used for filtering seed behaviors or recommendations, the purchase's broadest category, e.g., the category of the purchase that occurs at a relatively more general level of a browse hierarchy, may be determined at block 402. At block 403, it is determined whether to further narrow the category. In some embodiments, this determination may be made by checking whether users who purchase items in that category generally desire to purchase multiple items in that category. If they do, a narrower category may be selected for filtering purposes. In other embodiments, the determination may be made based on characteristics of the category, such as the functional or logical relationships of items in the category, the nature of the category or the items within it, the size of the category, the prices of items in the category, combinations of the same, or the like. In certain embodiments, the determination may be made by analyzing historical activity data of all users compiled, for example, by the data mining service 160.

If it is determined to narrow the category, the category is narrowed at block 404, for example, to the next level of a browse hierarchy, and the process continues back to block 403 with the narrowed category. If, on the other hand, the category is sufficiently narrow, the category may then be used to filter seed behaviors. In some embodiments, for example, seed behaviors occurring in the category, including seed behaviors occurring in the category but at lower levels of a browse hierarchy (e.g., in sub-categories of the category), may be filtered.

It should be noted that items and purchases may have multiple category designations, even at the same level of a hierarchy. For example, a carrying case for a digital camera might occur in both electronics and in electronics accessories. In such embodiments, seed behaviors may be filtered if they have one category in common with a purchase, if they have multiple categories in common with a purchase, and/or if they have all categories in common with a purchase.

It should also be noted that item catalog categories may be determined and/or equated with the help of human intelligence. For example, a human moderator may input a list of categories that are functionally equivalent for filtering purposes. For example, a moderator may decide that the high-end digital SLR cameras and compact camera categories within the more general digital camera category should be equivalent for filtering purposes. Such a determination may be appropriate because a user who decides to purchase an SLR, having decided which type of camera to buy, would likely not subsequently wish to purchase a compact camera.

VI. Example Website

Figure 5:
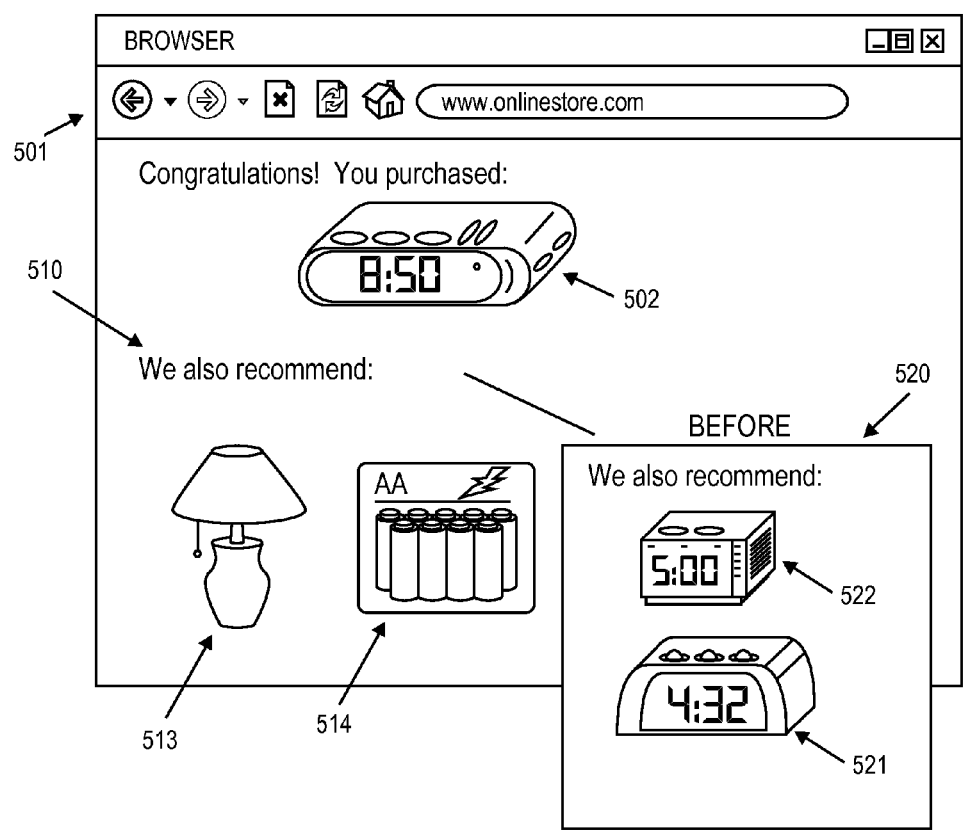
FIG. 5 illustrates an embodiment of a user interface for providing personalized recommendations.

FIG. 5 illustrates an embodiment of a user interface 500 that provides recommended items to users. In the depicted embodiment, the user interface 500 is show in the format of a web page. Recommendations need not be provided, however, in the form of a web page and may, for example, be provided by any other application, including a mobile application.

In FIG. 5, a user may access a web-based item catalog using a browser 501. In the example of FIG. 5, the user has purchased an alarm clock 502. The web site displays below the purchased item 502 a recommendation area 510, which contains items recommended for the user. Area 520 illustrates what the user's recommendations might look like if related history filtering is not applied. Although the user has already decided which alarm clock to purchase and has completed that purchase, the recommendations in area 520 include two additional alarm clocks, 521, 522. These recommendations may have been generated from the user's browsing activity directed to various alarm clock models, including the purchased model 502, in the alarm clock category. Likely, however, the user does not wish to purchase an additional alarm clock.

When related history filtering is applied, the recommendation engine may not rely on the user's activity, prior to the purchase, in the alarm clock category. Thus the recommendation area 510 may not include additional alarm clocks, and the user may find, following her purchase of alarm clock 502, recommended items 513, 514 more appropriate.

VII. Terminology

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of generating personalized recommendations, the method comprising:
   accessing user activity data of a target user to identify an item purchased by the target user, the purchased item being represented by item data in an electronic catalog;
   identifying, from the user activity data, seed behavior comprising: first browsing activity of the user with respect to the electronic catalog, the first browsing activity having occurred subsequent to a purchase of the purchased item by the target user, wherein the first browsing activity is not related to the purchase, and second, purchase-related browsing activity of the target user, the second, purchase-related browsing activity being related to the purchase of the purchased item and occurring prior to the purchase;
   filtering the second, purchase-related browsing activity out of the seed behavior to produce filtered seed behavior;
   generating recommendations for the target user using the filtered seed behavior comprising the first browsing activity of the user instead of the second, purchase-related browsing activity, thereby generating recommendations for the target user that are not based on the purchase-related browsing activity of the target user; and
   outputting the recommendations for presentation to the target user;
   wherein at least said generating is implemented by computer hardware.

2. The method of claim 1, wherein said identifying the purchase-related browsing activity further comprises identifying one or more of the following: items selected from the electronic catalog by the target user and searches in the electronic catalog conducted by the target user.

3. The method of claim 1, wherein said identifying the purchase-related browsing activity further comprises identifying items selected from the electronic catalog by the target user that are classified in a same category as a category of the purchased item.

4. A system for generating personalized recommendations, the system comprising:
   a seed behavior collector configured to access user activity data of a target user to identify an item purchased by the target user, the purchased item being represented by item data in an electronic catalog;
   a related history filter comprising computer hardware, the related history filter configured to:
      identify, from the user activity data, seed behavior comprising: first browsing activity of the user with respect to the electronic catalog, the first browsing activity having occurred subsequent to a purchase of the purchased item by the target user, wherein the first browsing activity is not related to the purchase, and second, purchase-related browsing activity of the target user, the second, purchase-related browsing activity being related to the purchase of the purchased item and occurring prior to the purchase, and
      filtering the second, purchase-related browsing activity out of the seed behavior to produce filtered seed behavior; and
   a recommendation engine configured to:
      generate recommendations for the target user using the filtered seed behavior comprising the first browsing activity of the user instead of the second, purchase-related browsing activity, thereby generating recommendations for the target user that are not based on the purchase-related browsing activity of the target user, and
      output the recommendations for presentation to the target user.

5. The system of claim 4, wherein the related history is further configured to identify the purchase-related browsing activity by at least identifying one or more of the following: items selected from the electronic catalog by the target user and searches in the electronic catalog conducted by the target user.

6. The system of claim 4, wherein the related history is further configured to identify the purchase-related browsing activity by at least identifying items selected from the electronic catalog by the target user that are classified in a same category as a category of the purchased item.

7. Non-transitory physical computer storage comprising executable instructions stored thereon that, when executed by one or more processors, cause the one or more processors to implement a system for generating personalized recommendations, the system comprising:
   a seed behavior collector configured to access user activity data of a target user to identify an item purchased by the target user, the purchased item being represented by item data in an electronic catalog;
   a related history filter module, the related history filter configured to:
      identify, from the user activity data, seed behavior comprising: first browsing activity of the user with respect to the electronic catalog, the first browsing activity having occurred subsequent to a purchase of the purchased item by the target user, wherein the first browsing activity is not related to the purchase, and second, purchase-related browsing activity of the target user, the second, purchase-related browsing activity being related to the purchase of the purchased item and occurring prior to the purchase, and filtering the second, purchase-related browsing activity out of the seed behavior to produce filtered seed behavior; and a recommendation engine configured to:

generate recommendations for the target user using the filtered seed behavior comprising the first browsing activity of the user instead of the second, purchase-related browsing activity, thereby generating recommendations for the target user that are not based on the purchase- related browsing activity of the target user, and output the recommendations for presentation to the target user.

8. The non-transitory physical computer storage of claim 7, wherein the related history filter module is further configured to identify the purchase-related browsing activity by at least identifying one or more of the following: items selected from the electronic catalog by the target user and searches in the electronic catalog conducted by the target user.

9. The non-transitory physical computer storage of claim 7, wherein the related history filter module is further configured to identify the purchase-related browsing activity by at least identifying items selected from the electronic catalog by the target user that are classified in a same category as a category of the purchased item.

* * * * *

UNITED STATES PATENT AND TRADEMARK OFFICE
CERTIFICATE OF CORRECTION

PATENT NO. : 8,396,760 B1  
APPLICATION NO. : 13/015413  
DATED : March 12, 2013  
INVENTOR(S) : Bradley et al.

Page 1 of 1

It is certified that error appears in the above-identified patent and that said Letters Patent is hereby corrected as shown below:

In the Claims:

In column 13 at line 13, In Claim 7, change "purchase- related" to --purchased-related--.

Signed and Sealed this  
Twenty-fourth Day of September, 2013

Teresa Stanek Rea  
*Deputy Director of the United States Patent and Trademark Office*